United States Patent
Huang

(10) Patent No.: US 6,267,406 B1
(45) Date of Patent: Jul. 31, 2001

(54) STRUCTURE OF FOLDING-COLLAPSIBLE DOUBLE-SEAT BABY STROLLER

(76) Inventor: Mien Chen Huang, 123-2 Pitou, Kuanmiao, Tainan (TW)

( * ) Notice: Subject to any disclaimer, the term of this patent is extended or adjusted under 35 U.S.C. 154(b) by 0 days.

(21) Appl. No.: 09/634,814

(22) Filed: Aug. 8, 2000

(51) Int. Cl.⁷ ............................................. B62B 7/08
(52) U.S. Cl. ........................ 280/647; 280/650; 280/658; 280/47.38
(58) Field of Search ............................ 280/642, 643, 280/644, 647, 648, 649, 650, 657, 658, 47.38, 47.4, 30, 33.991, 33.993; D12/129

(56) References Cited

U.S. PATENT DOCUMENTS

| | | | |
|---|---|---|---|
| D. 311,363 | * | 10/1990 | Lin ........................................ D12/129 |
| D. 321,850 | * | 11/1991 | Mong-Hsing ........................ D12/129 |
| D. 360,392 | * | 7/1995 | Lewandowski ..................... D12/129 |
| D. 370,437 | * | 6/1996 | Siesholtz et al. ................... D12/129 |
| D. 429,476 | * | 8/2000 | Gehr ..................................... D12/129 |
| D. 429,664 | * | 8/2000 | Gehr ..................................... D12/129 |
| D. 430,076 | * | 8/2000 | Gehr ..................................... D12/129 |
| 2,669,460 | * | 2/1954 | Wallner .............................. 280/47.38 |
| 2,769,482 | * | 11/1956 | Carlson .............................. 280/47.35 |
| 2,857,953 | * | 10/1958 | Berger et al. ...................... 280/47.35 |
| 2,993,702 | * | 7/1961 | Gill ..................................... 280/643 |
| 3,309,101 | * | 3/1967 | Romay .............................. 280/47.38 |
| 4,542,915 | * | 9/1985 | Wheeler, III et al. .............. 280/642 |
| 4,657,269 | * | 4/1987 | Elvin ................................. 280/47.38 |
| 4,725,071 | * | 2/1988 | Shamie ............................. 280/643 |
| 5,018,754 | * | 5/1991 | Cheng ............................... 280/47.4 |
| 5,167,425 | * | 12/1992 | Chen ................................. 280/648 |
| 5,184,835 | * | 2/1993 | Huang ............................ 280/47.371 |
| 5,338,096 | * | 8/1994 | Huang ............................... 297/243 |
| 5,417,449 | * | 5/1995 | Shamie ............................ 280/642 |
| 5,653,460 | * | 8/1997 | Fogarty ............................ 280/642 |
| 5,664,795 | * | 9/1997 | Huang ............................. 280/47.38 |
| 5,722,682 | * | 3/1998 | Wang ............................... 280/642 |
| 5,918,891 | * | 7/1999 | Russell ........................... 280/33.991 |
| 6,086,087 | * | 7/2000 | Yang ............................... 280/658 |
| 6,099,022 | * | 8/2000 | Pring ............................... 280/648 |
| 6,126,181 | * | 10/2000 | Ondrasik ....................... 280/33.991 |

FOREIGN PATENT DOCUMENTS

| | | | |
|---|---|---|---|
| 4337917 | * | 5/1994 | (DE) .............................. 280/33.993 |
| 2615-155 | * | 11/1988 | (FR) ............................... 280/642 |

* cited by examiner

Primary Examiner—Brian L. Johnson
Assistant Examiner—Bridget Avery
(74) Attorney, Agent, or Firm—Pro-Techtor International Services

(57) ABSTRACT

A folding-collapsible double-seat baby stroller includes two front wheel frames, a handle, two stepped top frames and two stepped bottom frames bilaterally horizontally coupled between the front wheel frames and the handle, the top frames and bottom frames each having a higher rear side and a lower front side, two rear wheel frames respectively pivoted to the top frames, two support frames bilaterally coupled between the rear wheel frames and the handle, a front seat mounted on the front side of the bottom frames, a rear seat mounted on the rear side of the bottom frames above the elevation of the front seat, and a locking mechanism adapted to lock the handle and the support frames, keeping the folding-collapsible double-seat baby stroller in the extended position.

7 Claims, 7 Drawing Sheets

STRUCTURE OF FOLDING-COLLAPSIBLE DOUBLE-SEAT BABY STROLLER

BACKGROUND OF THE INVENTION

The present invention relates baby strollers, and more particularly to a simple folding-collapsible structure of baby stroller, which comprises two seats arranged to carry two babies at different elevations.

FIGS. from 1 through 3 show a folding-collapsible double-seat baby stroller according to the prior art. This structure of folding-collapsible double-seat baby stroller comprises two front wheel frames 10, two rear wheel frames 20, a top frame 30, a bottom frame 40 a handle 50, two folding handrails 60, two front handrails 70, and two links 80. The top frame 30 and the bottom frame 40 are arranged in parallel. The links 80 are coupled between the top frame 30 and the bottom frame 40. The top frame 30 has a rear side pivoted to the handle 50. The bottom frame 40 has a front side pivoted to the front wheel frames 10, and a rear side pivoted to the two distal ends of the handle 50. The top frame 30 holds a front seat 100 and a rear seat 200. The front handrails 70 are coupled between the front wheel frames 10 and the rear wheel frames 20, and disposed at two opposite lateral sides of the front seat 100. The folding handrails 60 are coupled between the handle 50 and the top frame 30, and disposed at two opposite lateral sides of the rear seat 200. This structure of double-seat baby stroller is complicated. The installation of the front handrails 70 and the folding handrails 60 greatly increase the manufacturing cost of the baby stroller. Further, because the front seat 100 and the rear seat 200 are disposed at the same elevation at the top frame 30, the baby sitting in the front seat will block the sight of the baby sitting in the rear seat.

SUMMARY OF THE INVENTION

The invention has been accomplished to provide a baby stroller, which eliminates the aforesaid drawbacks. It is one object of the present invention to provide a baby stroller, which is compact and folding collapsible. It is another object of the present invention to provide a baby stroller, which provides two seats for two babies. It is still another object of the present invention to provide a baby stroller, which has two seats arranged at different elevations so that the baby in the front seat does not block the sight of the baby in the rear seat. According to one aspect of the present invention, the folding collapsible double-seat baby stroller comprises folding-collapsible double-seat baby stroller includes two front wheel frames, a handle, two stepped top frames and two stepped bottom frames bilaterally horizontally coupled between the front wheel frames and the handle, the top frames and bottom frames each having a higher rear side and a lower front side, two rear wheel frames respectively pivoted to the top frames, two support frames bilaterally coupled between the rear wheel frames and the handle, a front seat mounted on the front side of the bottom frames, and a rear seat mounted on the rear side of the bottom frames above the elevation or the front seat. According to another aspect of the present invention, the top frames are disposed at two opposite lateral sides of the front seat and the rear seat, and served as handrail means for the front seat and the rear seat. According to still another aspect of the present invention, the folding-collapsible double-seat baby stroller further comprises a locking mechanism adapted to lock the handle and the support frames, keeping the folding-collapsible double-seat baby stroller in the extended position.

DETAILED DESCRIPTION OF THE PREFERRED EMBODIMENT

Figure 1:
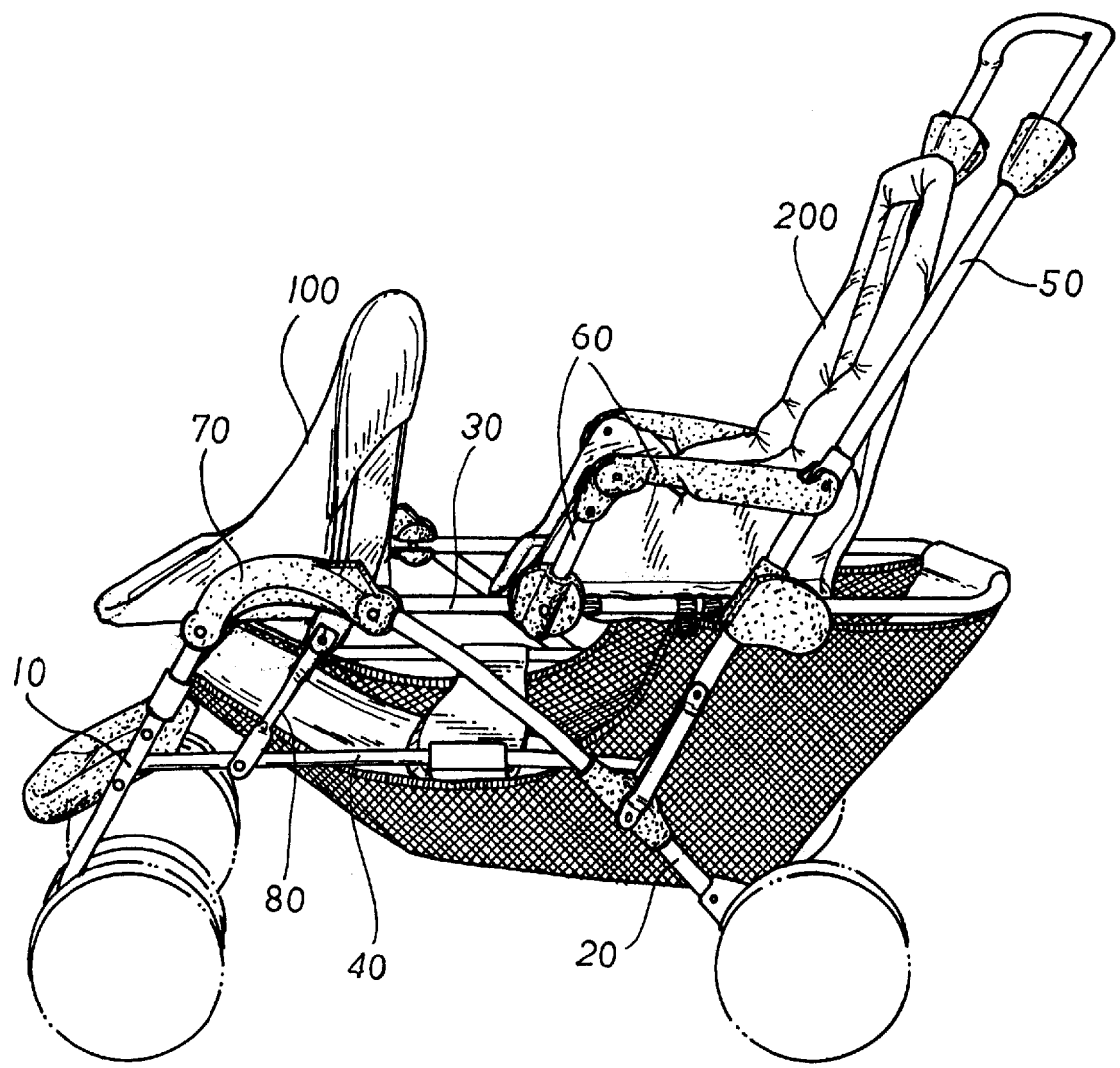
FIG. 1 is perspective view of a folding-collapsible double-seat baby stroller according to the prior art.
Figure 2:
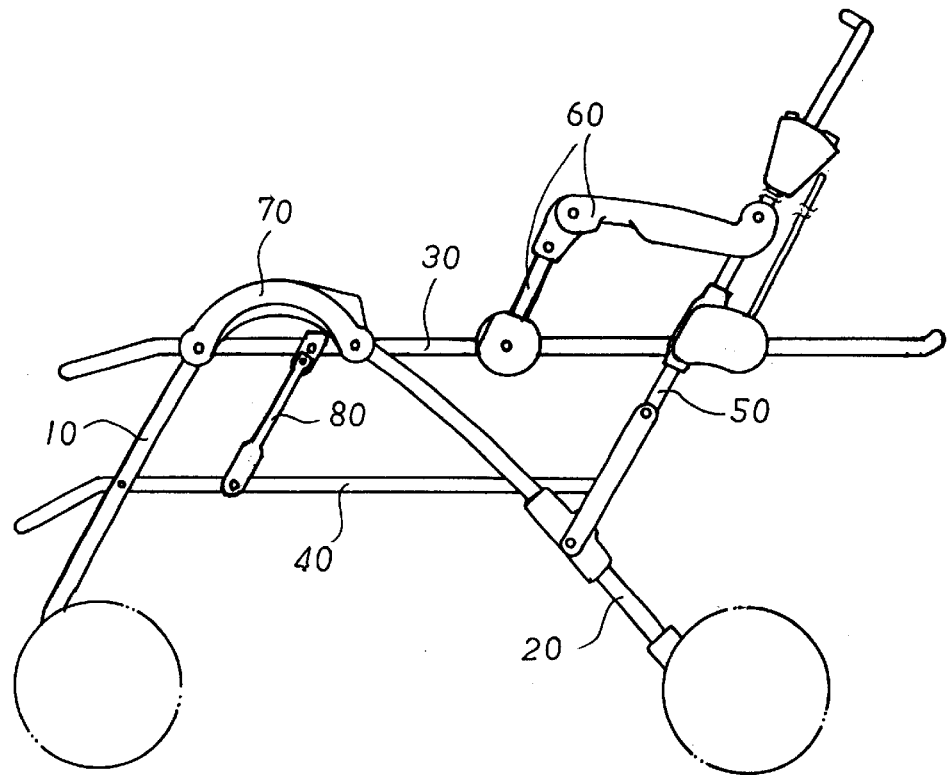
FIG. 2 is a side view of the folding-collapsible frame structure of the folding-collapsible double-seat baby stroller shown in FIG. 1.
Figure 3:
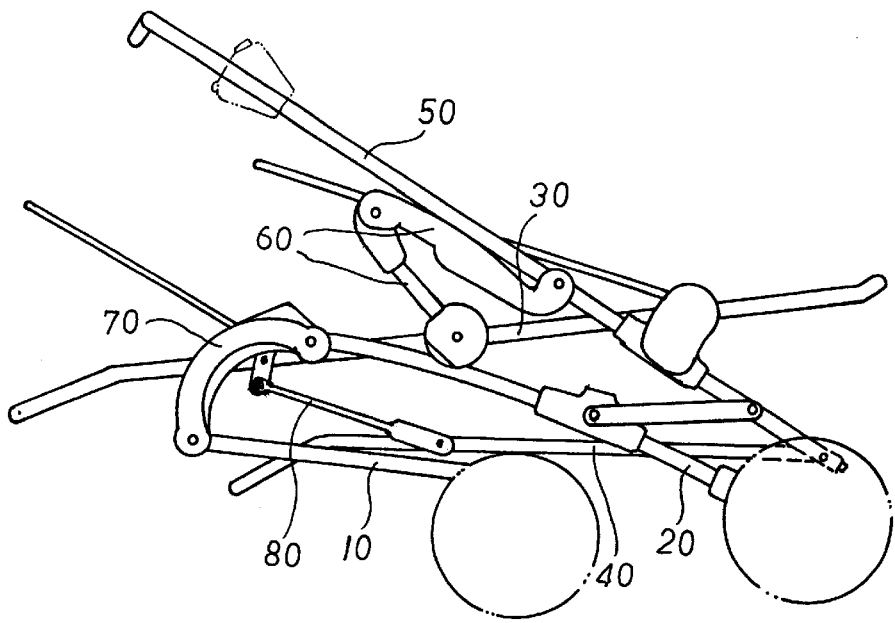
FIG. 3 shows the folding collapsible frame of the prior art folding-collapsible double-seat baby stroller collapsed.
Figure 4:
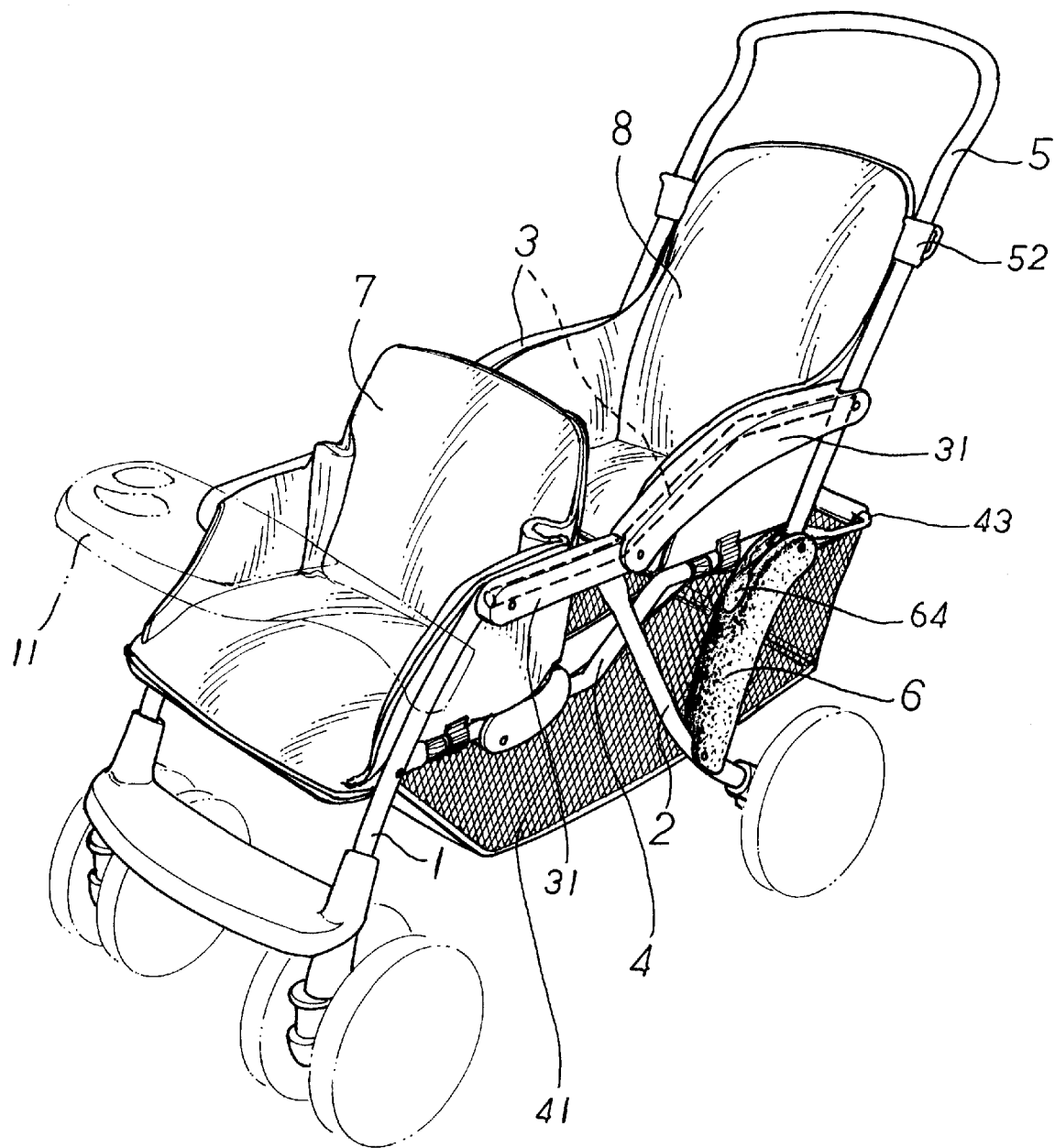
FIG. 4 is a perspective view of a folding-collapsible double-seat baby stroller according to the present invention.
Figure 5:
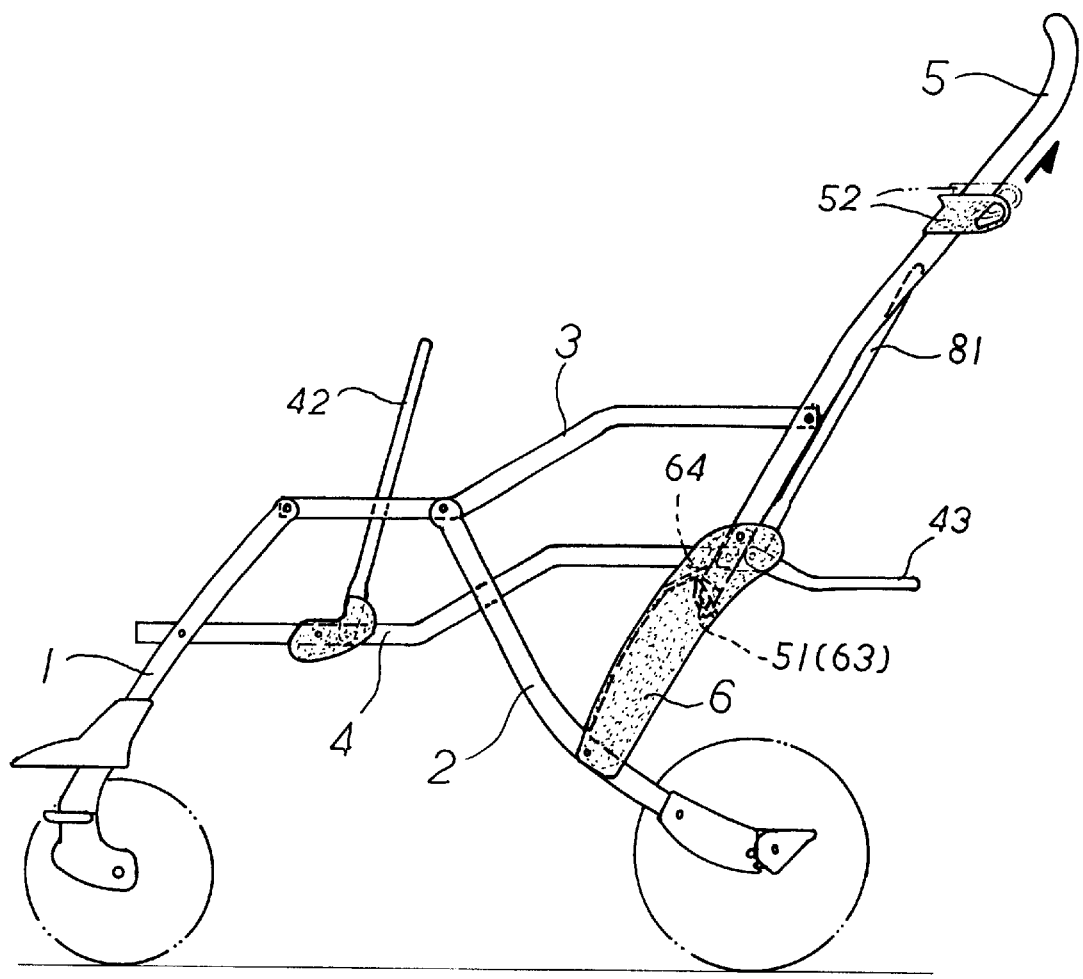
FIG. 5 is a side view of the folding-collapsible frame structure of the folding-collapsible double-seat baby stroller according to the present invent ion.
Figure 6:
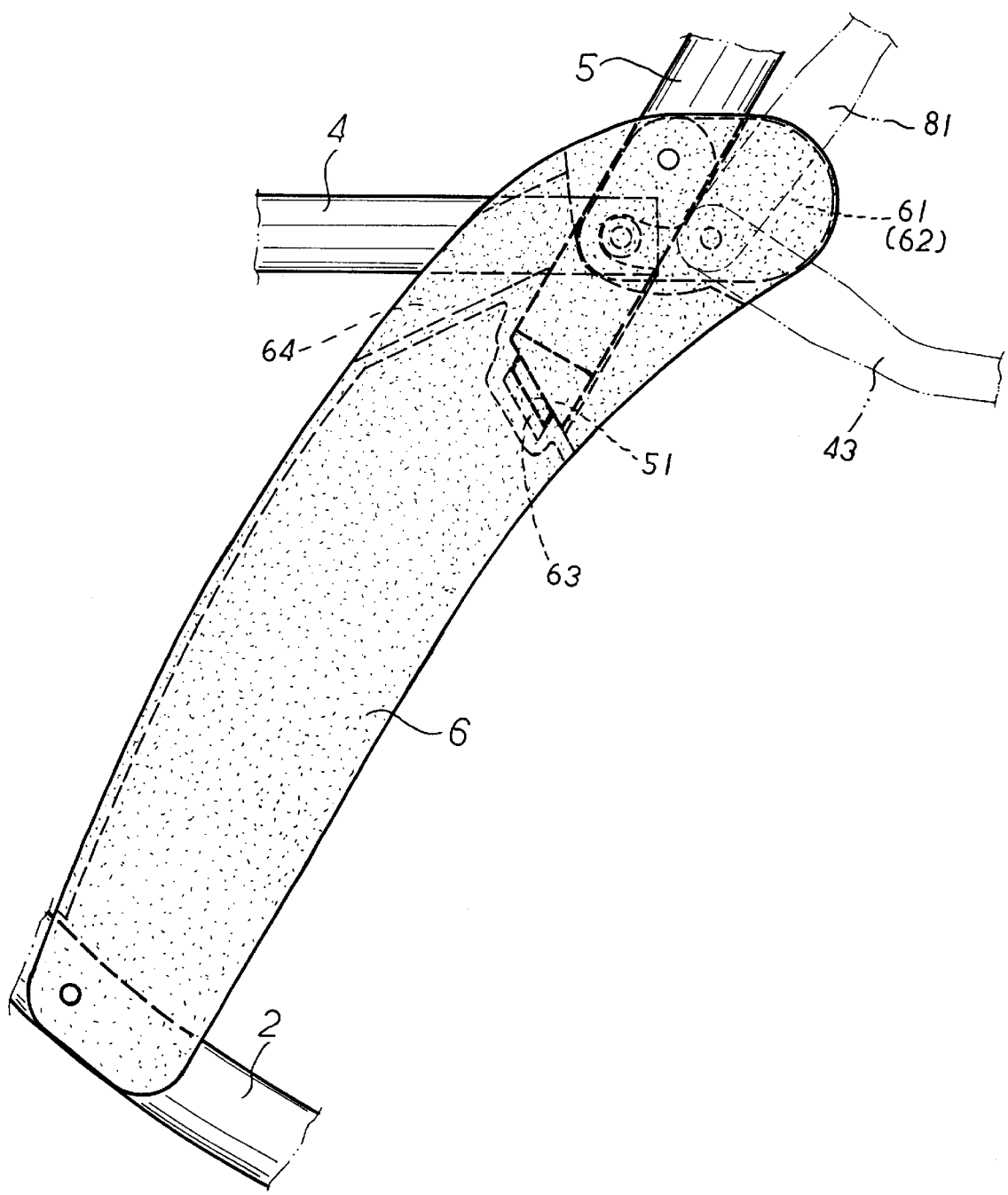
FIG. 6 illustrates the positioning of the handle in the support frame when the folding-collapsible double-seat baby stroller extended out.
Figure 7:
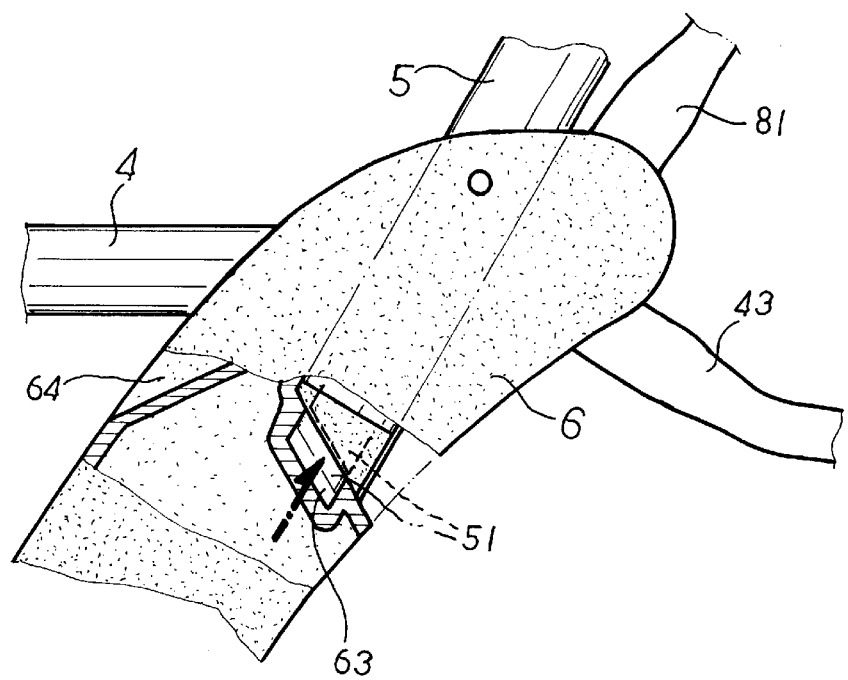
FIG. 7 is a sectional view in an enlarged scale of a part of the present invention, showing the unlocking action of the locking mechanism.
Figure 8:
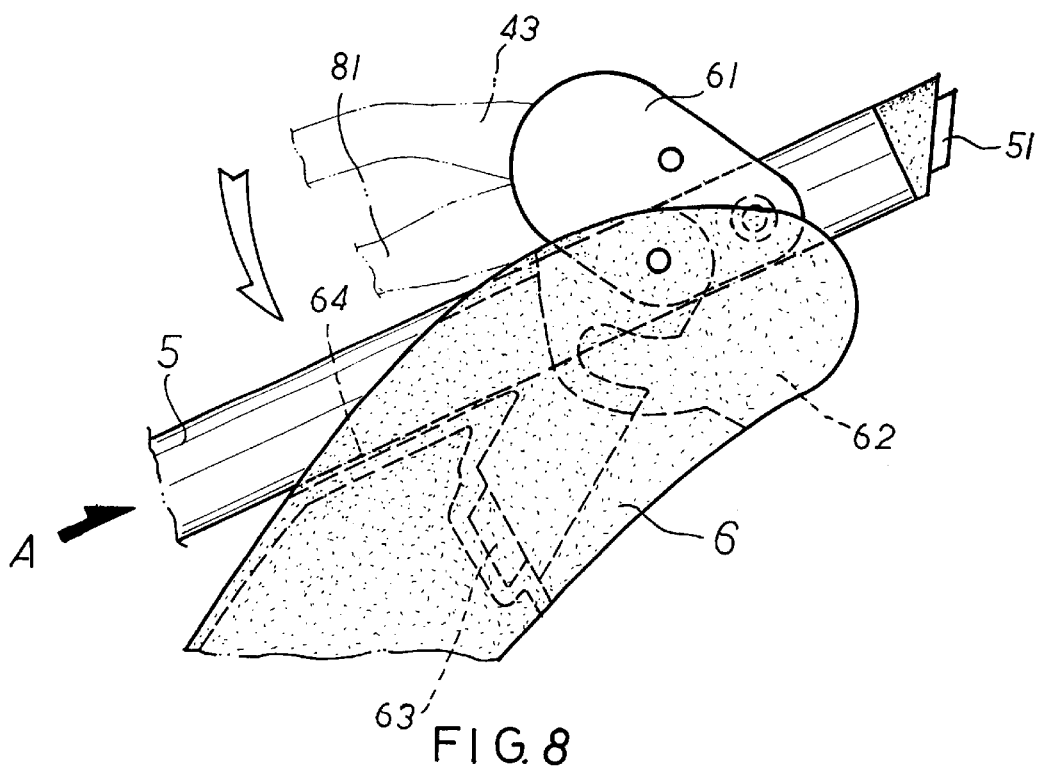
FIG. 8 is a schematic drawing showing the handle collapsed and engaged into the engagement groove of the support frame.
Figure 9:
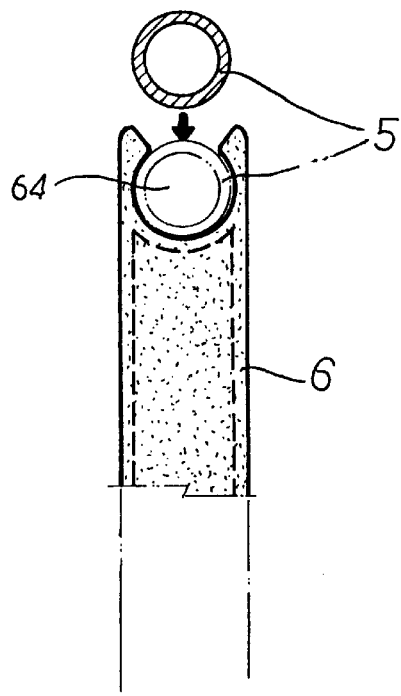
FIG. 9 is an A-angle view of FIG. 8.
Figure 10:
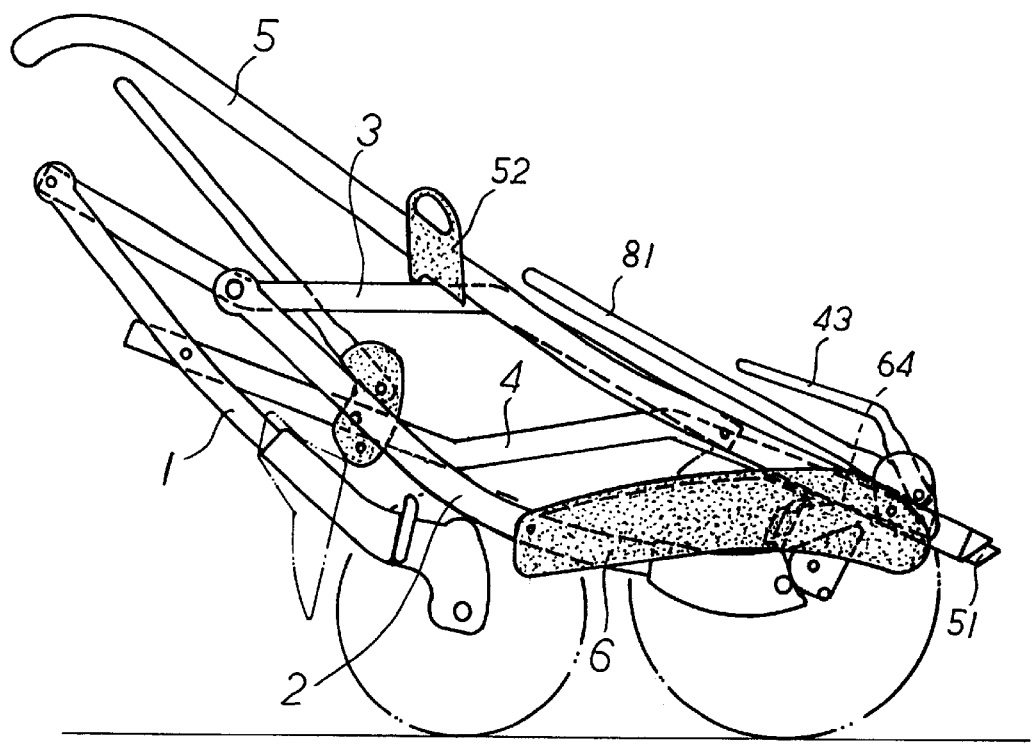
FIG. 10 shows the folding collapsible frame structure of the folding-collapsible double-seat baby stroller collapsed according to the present invention.

Referring to FIGS. 4 and 5, a folding-collapsible double-seat baby stroller in accordance with the present invention is shown comprised of two front wheel frames 1, two rear wheel frames 2, two top frames 3, two bottom frames 4, a handle 5, and two support frames 6. The support frames 6 are bilaterally coupled between the handle 5 and the rear wheel frames 2. The top frames 3 and the bottom frames 4 are stepped frame bars arranged in horizontal at different elevations, each having a higher rear side and a lower front side. The front and rear ends of the top frames 3 and the bottom frames 4 are respectively pivoted to the front wheel frames 1 and the handle 5. A front seat 7 is installed in the bottom frames 4 at the front side. A rear seat 8 is installed in the bottom frames 4 at the rear side above the elevation of the front seat 7. Because the rear seat 8 is raised behind the front seat 7, the baby in the front seat 7 does not block the sight of the baby in the rear seat 8. Further, the top frames 3 serve as handrail means for the front seat 7 and the rear seat 8. Flexible cover members 31 may be covered on the top frames 3. The top end of each rear wheel frame 2 is respectively pivoted to the top frames 3. A basket 41 is hung on the bottom frames 4. A table 11 may be provided between the front wheel frames 1 in front of the front seat 7. Further, a back support 42 is fastened to the bottom frames 4 and adapted to support the back of the front seat 7.

Referring to FIGS. from 6 through 10, the support frames 6 are respectively coupled between the two distal ends of the handle 5 and the rear wheel frames 2. The top end of each support frame 6 is mounted with a swivel coupling plate 61. The swivel coupling plate 61 of each support frame 6 is respectively pivoted to the handle 5. Each support frame 6 has a top recess 62 for swinging movement of the respective swivel coupling plate 61, a retaining hole 63 adapted to hold the handle 5 in the operative position, and an engagement groove 64 adapted to hold the handle 5 in the non-operative position. The rear seat 8 has a back frame 81 respectively pivoted to the coupling plate 61 at each support frame 6. A locking mechanism is installed in the handle 5 for collapsing control. The locking mechanism comprises two spring latches 51 respectively installed in the two distal ends of the handle 5 and adapted to engage the retaining hole 63 of the coupling plate 61 at each support frame 6, and a control unit 52 mounted on the handle 5 at a suitable location for operation by hand to disengage the spring latches 51 from the first retaining groove of the coupling plate 61 at each support frame 6 (see FIGS. from 6 through 8). When the folding-collapsible double-seat baby stroller is collapsed, the handle 5 is forced into the engagement groove 64 of the coupling plate 61 at each support frame 6 and secured in place by friction resistance between the handle 5 and the coupling plate 61 at each support frame 6 (see FIGS. from 8 through 10). Further, a foldaway hanger 43 is mounted on the back frame 81 of the rear seat 8, and adapted to hold a basket 41 on the bottom frames 4.

As indicated above, the top frames 3 and the bottom frames 4 have a stepped-like profile to hold the front seat 7 and the rear seat 8 at different elevations the baby in the front seat 7 does not block the sight of the baby in the rear seat 8. Further, the arrangement of the support frames 6 enables the handle 5 to be positively held between the operative position and the non-operative position.

While only one embodiment of the present invention has been shown and described, it will be understood that various modifications and changes could be made thereunto without departing from the spirit and scope of the invention disclosed.

What the invention claimed is:

1. A folding-collapsible double-seat baby stroller comprising two front wheel frames, two rear wheel frames, two top frames, two bottom frames, and a handle; wherein said top frames and said bottom frames are stepped frame bars arranged in horizontal at different elevations, each having a higher rear side and a lower front side, a front end respectively pivoted to said front wheel frames, a rear end respectively pivoted to two distal ends of said handle; said bottom frames hold a front seat at the lower front side thereof and a rear seat at the higher rear side thereof above the elevation of said front seat; said top frames are disposed at two opposite lateral sides of said front seat and said rear seat and adapted to work as handrail means for babies sitting in said front seat and said rear seat.

2. The folding-collapsible double-seat baby stroller of claim 1 wherein said top frames are covered with flexible cover means.

3. The folding-collapsible double-seat baby stroller of claim 1 further comprising a back support fastened to said bottom frames and adapted to support said front seat.

4. The folding-collapsible double-seat baby stroller of claim 1 further comprising two support frames bilaterally coupled between said handle and said rear wheel frames.

5. The folding-collapsible double-seat baby stroller of claim 4 further comprising a locking mechanism adapted to lock said handle when the folding-collapsible double-seat baby stroller is extended out, said locking mechanism comprising two spring latches respectively mounted in two distal ends of said handle and adapted to engage in a respective retaining hole on said support frames, and a control unit pivoted to said handle and turned to disengage said spring latches from the respective retaining hole on said support frames.

6. The folding-collapsible double-seat baby stroller of claim 5 wherein said support frames each comprise an engagement groove adapted to receive said handle when the folding-collapsible double-seat baby stroller is collapsed.

7. The folding-collapsible double-seat baby stroller of claim 6 wherein said support frames each have a top end mounted with a swivel coupling plate, and a top recess for swinging movement of said swivel coupling plate, said swivel coupling plate having one end pivoted to the respective support frame and an opposite end pivoted to said handle and a back frame of said rear seat.

* * * * *